T. Dixcee,
Brick Machine.
3 Sheets, Sheet 2.
N° 64,504. Patented May 7, 1867.
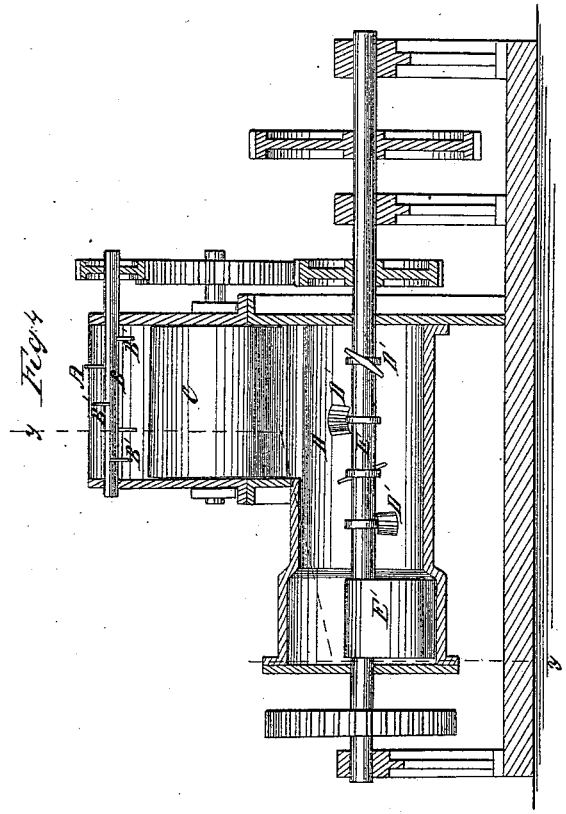
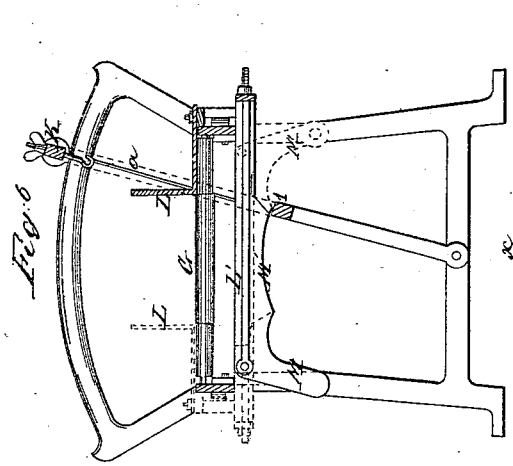
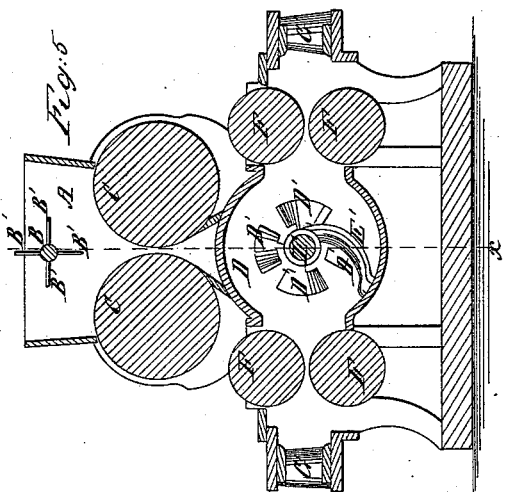
Witnesses
Thos Tusche
Wm Truurn
Inventor
Thos Dixell
Per Munube Atty

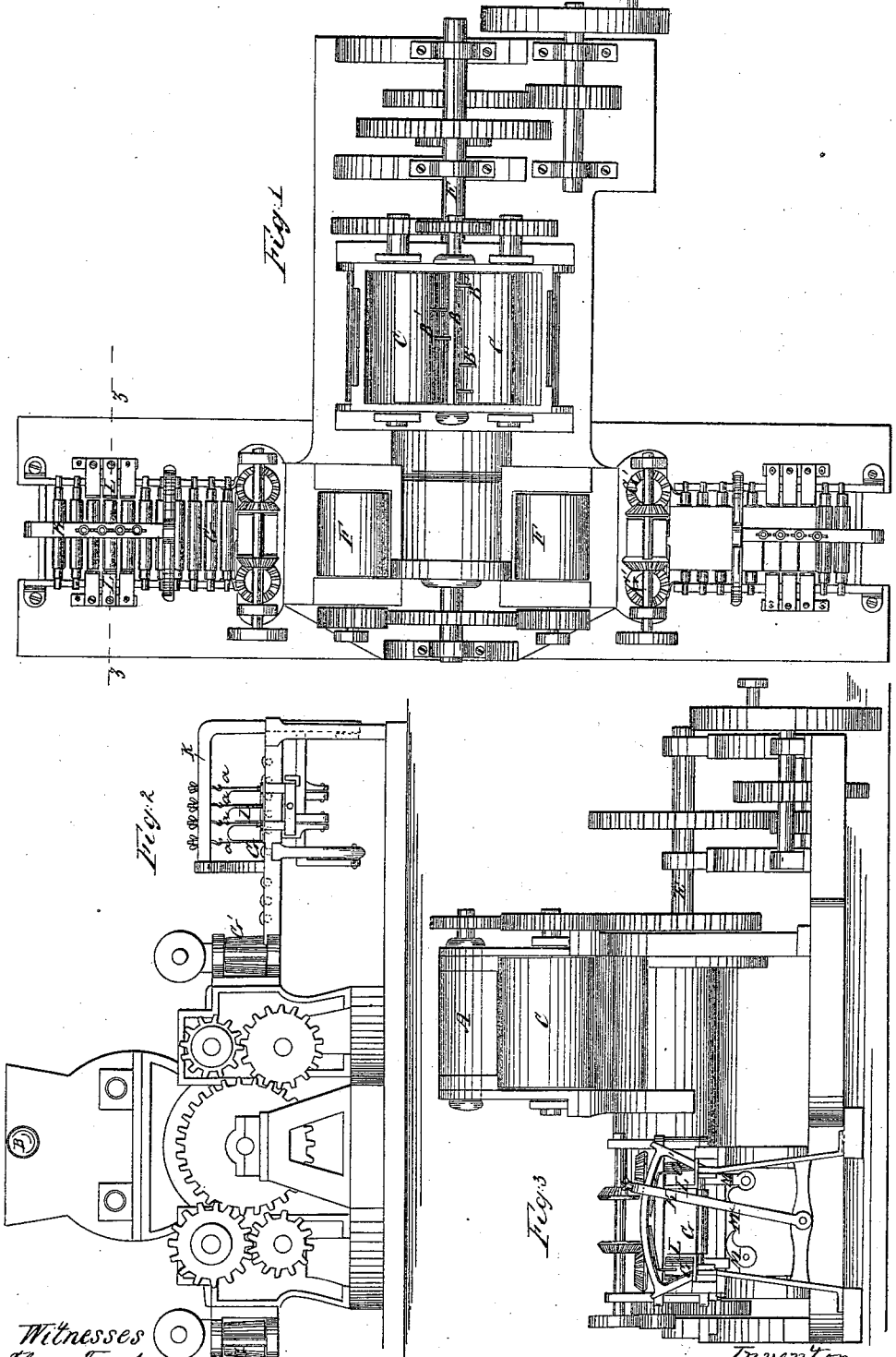

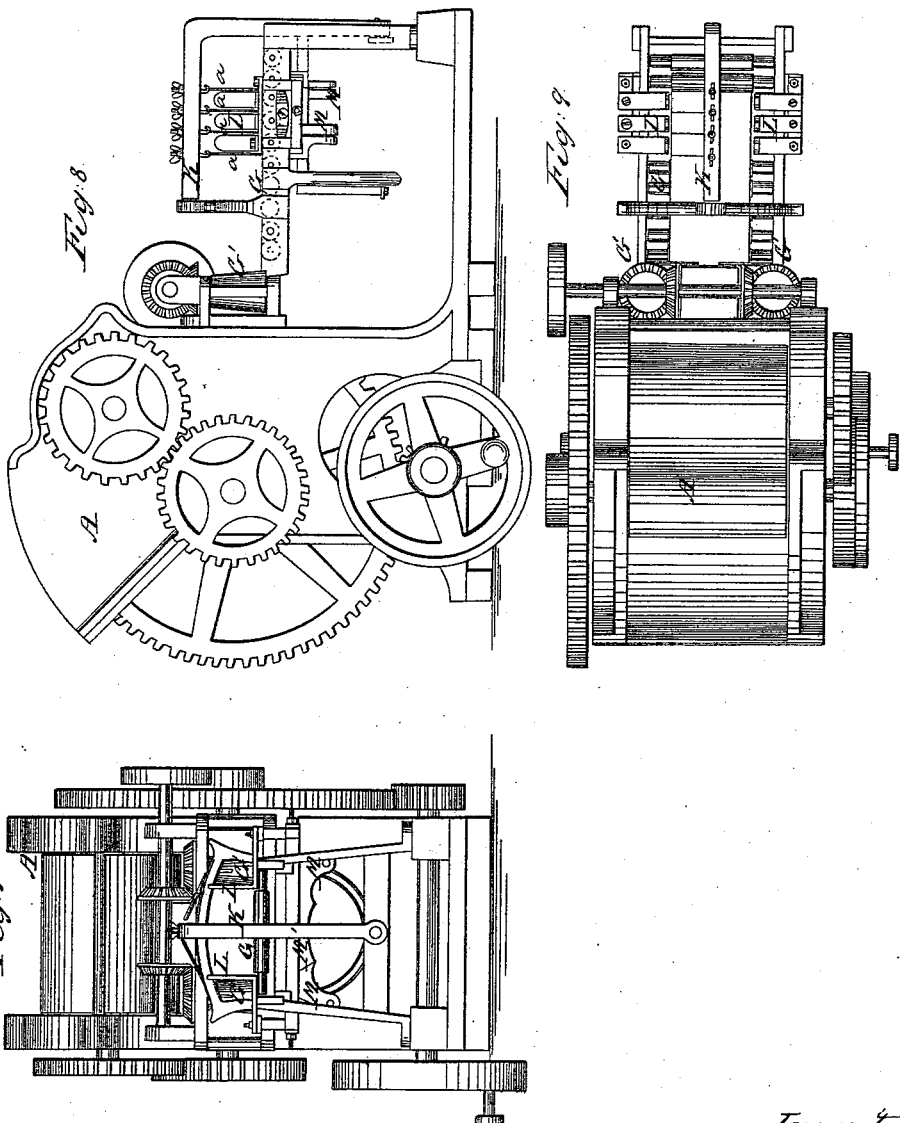

United States Patent Office.

THOMAS DIXCEE, OF WOODFIELD ROAD, ENGLAND.

Letters Patent No. 64,504, dated May 7, 1867.

---

IMPROVED BRICK MACHINE.

---

The Schedule referred to in these Letters Patent and making part of the same.

---

TO ALL WHOM IT MAY CONCERN:

Be it known that I, THOMAS DIXCEE, of the firm of Clayton and Company, of the Atlas Works, Woodfield Road, in the county of Middlesex, engineer, have invented "Improvements in Machinery for the Manufacture of Bricks, Tiles, and other Articles from Clay or other Plastic Materials;" and I do hereby declare that the following is a full and exact description of my said invention.

My invention consists of improvements in machinery for the manufacture of bricks, tiles, or other articles from clay or plastic material, with arrangements and combinations of parts whereby three distinct operations are produced and carried on simultaneously, viz, crushing, pugging or mixing, and also moulding the bricks, tiles, or other articles, by forcing the plastic substance through lateral orifices.

The nature of the invention will be best understood by explaining the operation of the various parts, reference being had to the accompanying drawings.

Figure 1, Sheet I, is a plan view of the machine.

Figure 2 is an end elevation, showing one receiving-table for the bricks, tiles, or other articles. It is intended, however, to place a similar receiving-table on the other side of the machine, as shown at fig. 1.

Figure 3 is a side elevation.

Figure 4, Sheet II, is a vertical side section; and

Figure 5, a cross-section of the machine, in both of which the internal working parts may be clearly seen.

Figure 6 is a cross-section taken in the line z z, fig. 1.

The brick, earth, clay, or other plastic material, after being dug, is put into the hopper A, in which is a horizontal axle, B, fitted with rods or blades, B', for cutting and assisting in forcing the clay through the space between the crushing-rollers C C. These rollers may be adjustable in their bearings, so that they may be put closer or further from each other, as may be required for the class of goods intended to be made from the clay or other plastic material. From the crushing-rollers C the clay or other plastic material passes into the cylinder D, figs. 4 and 5, where it is mixed, and in which are screw-like blades, D', for amalgamating or mixing the clay. These blades are fixed on the horizontal shaft E, and at the end of such horizontal shaft is fixed a cam-feeder, E'. Or, if preferred, a series of knives may be mounted on the shaft in the cylindrical chamber, for the purpose of forcing the clay forward to the moulding-orifices. These feeders or screw-like blades deliver the clay continuously through the lateral moulding-orifices in a form suitable for being divided up into bricks, tiles, or other articles. It will be seen in the plan, fig. 1, and in the sectional view, fig. 5, that there are two sets of delivery-rollers, F F, and receiving-tables attached thereto, and the clay exudes simultaneously at each side of the machine between the rollers F F and through dies or moulding-orifices, from which it passes on to the horizontal cutting apparatus G G, from which, after being cut into bricks, tiles, pipes, or other articles by means of the cutting apparatus hereinafter described, such articles are removed by the attendants. The operation of the rollers F F is to force out the stream of clay or other plastic material without air-bubbles. It is most desirable that as it issues from the machine a solid and compact mass of clay should be produced, (prior to dividing it into the form of bricks,) with clean, sharp angles. In order to facilitate the delivery of the clay from the horizontal moulding-rollers F F, to keep the angles in perfect form, guide-rollers G' G' are placed at the end of the moulding-rollers F, or near the dies or moulding-orifices. These rollers are covered with fustian or any other suitable napped fabric, in order to prevent the clay from adhering thereto, and these rollers are kept wet by a stream of water from a small box placed above them. By this means the clay, as it issues from the machine through the moulding-orifices for the formation of bricks, tiles, or other articles, is kept in proper form, and will be pushed forward on the receiving-frame until it arrives in front of the wires, where the mass of clay will be divided up into the forms of bricks, tiles, pipes, or other articles. This frame K for dividing the articles is shown on an enlarged scale at fig. 6. It is provided with a series of cutting wires arranged at any distance apart that may be desirable or requisite, and with this vibrating frame K are combined the balance-levers M M below. In the operation of cutting the bricks, tiles, pipes, or other articles, there are two guide-fences, L L, to hold the clay or other plastic material in its position while being divided, by passing the cutting-bar K K, which carries the wires a, from one side to the other. These levers M are provided with arms M' M', the under sides of which form cams, as seen at figs. 3 and 6. The horizontal bar 1, fig. 6, which may, if desired, be provided with bowls or anti-friction wheels, is attached to the frame K, and works against the cam-frame on the under side of the arms M' M' of the levers M, and will lift up the arms, and thus (through the connecting-rods and frame L' L') will draw forward the holders L L and cause them to clasp the clay during the process of cutting; and when the clay is divided or cut into bricks, tiles, or other articles, they are to be removed by the attendants, as before mentioned.

From the foregoing description, reference being had to the drawing, it will be seen that the operations of crushing, pugging, or amalgamating the plastic material for bricks, tiles, pipes, or other articles, are combined with the moulding and cutting operation. All these operations are carried on simultaneously.

In Sheet III I have shown at Figures 7, 8, and 9, an end elevation, side elevation, and plan of a machine, of a construction which embraces simply the compressing and moulding apparatus for the manufacture of bricks, tiles, pipes, or other articles. In this case the clay must be previously submitted to crushing or pugging, as the case may require, and must be thrown into the hopper A in a proper state to be passed through the machine and exuded from the lateral moulding-orifices. From the hopper the clay is received by the compressing-rollers, and is forced forward through or out of the die or moulding-orifice on to the receiving-table, as in the other instance before named, and is then divided in the manner already explained by means of the cutting apparatus.

Having thus described my invention, what I claim as new, and desire to secure by Letters Patent, is—

1. The crushing or grinding-rollers C, in connection with the amalgamating or mixing-blades D', and the rollers G' at the moulding-orifice or orifices, substantially as and for the purposes set forth.

2. The cutting-wires $a$ attached to the bar K, with the guide-fences L L, combined and arranged to operate in the manner substantially as and for the purpose specified.

In witness whereof I, the said THOMAS DIXCEE, have hereunto set my hand and seal the fourth day of December, in the year of our Lord 1866.

THOMAS DIXCEE. [L. S.]

Witnesses:
    H. A. CARTER, *Atlas Works, Harrow Road, Gent,*
    W. W. WYNN, 24 *Royal Exchange, London, Clerk.*